US011834593B2

(12) United States Patent
Baldini et al.

(10) Patent No.: US 11,834,593 B2
(45) Date of Patent: Dec. 5, 2023

(54) ELECTRICALLY CONDUCTIVE ADHESIVE

(71) Applicant: Zoltek Corporation, Bridgeton, MO (US)

(72) Inventors: Steven Eric Baldini, Saint Charles, MO (US); David Michael Corbin, Saint Peters, MO (US)

(73) Assignee: ZOLTEK CORPORATION, Bridgeton, MO (US)

( * ) Notice: Subject to any disclaimer, the term of this patent is extended or adjusted under 35 U.S.C. 154(b) by 0 days.

(21) Appl. No.: 17/884,734

(22) Filed: Aug. 10, 2022

(65) Prior Publication Data

US 2022/0380637 A1 Dec. 1, 2022

Related U.S. Application Data

(62) Division of application No. 17/041,735, filed as application No. PCT/US2019/024563 on Mar. 28, 2019, now Pat. No. 11,447,666.

(Continued)

(51) Int. Cl.
| | |
|---|---|
| *C09J 9/02* | (2006.01) |
| *H01B 1/24* | (2006.01) |
| *B32B 5/12* | (2006.01) |
| *B32B 7/12* | (2006.01) |
| *B32B 27/08* | (2006.01) |

(Continued)

(52) U.S. Cl.
CPC .................. *C09J 9/02* (2013.01); *B32B 5/12* (2013.01); *B32B 7/12* (2013.01); *B32B 27/08* (2013.01); *B32B 27/30* (2013.01); *B32B 27/38* (2013.01); *C09J 11/04* (2013.01); *C09J 163/00* (2013.01); *H01B 1/24* (2013.01); *B32B 2250/24* (2013.01); *B32B 2307/202* (2013.01); *C08K 7/06* (2013.01); *C08K 2201/001* (2013.01);

(Continued)

(58) Field of Classification Search
CPC ..... H01B 1/24; C09J 9/02; C09J 11/04; C09J 11/06; C09J 163/00
See application file for complete search history.

(56) References Cited

U.S. PATENT DOCUMENTS

| | | | |
|---|---|---|---|
| 8,216,439 | B2 | 7/2012 | Olevsky et al. |
| 8,784,589 | B2 | 7/2014 | Ackerman et al. |

(Continued)

FOREIGN PATENT DOCUMENTS

| | | |
|---|---|---|
| CN | 101903485 A | 12/2010 |
| CN | 102277097 A | 12/2011 |

(Continued)

OTHER PUBLICATIONS

Dilsiz et al "Effect of acid-base properties of unsized and sized carbon fibers on fiber/epoxy matrix adhesion", Colloids and Surfaces A: Physicochemical and Engineering Aspects 164 (2000) 325-336.*

(Continued)

*Primary Examiner* — Mark Kopec
(74) *Attorney, Agent, or Firm* — RATNERPRESTIA

(57) ABSTRACT

Disclosed herein is an electrically conductive adhesive composition, which including milled carbon fibers dispersed in a thermosetting resin and a curative agent. Also, disclosed herein are articles comprising at least two components adhesively bonded by the electrically conductive adhesive composition and methods of making such adhesives and articles.

9 Claims, 7 Drawing Sheets

Related U.S. Application Data

(60) Provisional application No. 62/649,054, filed on Mar. 28, 2018.

(51) Int. Cl.

| | | |
|---|---|---|
| *B32B 27/30* | (2006.01) | |
| *B32B 27/38* | (2006.01) | |
| *C09J 11/04* | (2006.01) | |
| *C09J 163/00* | (2006.01) | |
| *F03D 80/30* | (2016.01) | |
| *C08K 7/06* | (2006.01) | |
| *F03D 1/06* | (2006.01) | |

(52) U.S. Cl.
CPC .......... *F03D 1/0675* (2013.01); *F03D 80/30* (2016.05); *F05B 2280/6013* (2013.01)

(56) References Cited

U.S. PATENT DOCUMENTS

| | | | |
|---|---|---|---|
| 9,441,086 B2 | 9/2016 | Albaugh et al. | |
| 9,601,227 B2 | 5/2017 | Reguera et al. | |
| 9,670,385 B2 | 6/2017 | Namiki et al. | |
| 9,725,628 B2 | 8/2017 | McGrath | |
| 2003/0165638 A1 | 9/2003 | Louks et al. | |
| 2003/0219646 A1 | 11/2003 | LeCostaouec | |
| 2004/0134565 A1 | 7/2004 | Powell et al. | |
| 2004/0254294 A1 | 12/2004 | Clulow et al. | |
| 2006/0270810 A1* | 11/2006 | Yasumura ........... | C08F 290/064 525/529 |
| 2010/0135820 A1 | 6/2010 | Olson | |
| 2011/0045273 A1* | 2/2011 | Handa ................. | B82Y 30/00 428/293.1 |
| 2011/0171036 A1 | 7/2011 | Esaki et al. | |
| 2012/0070646 A1 | 3/2012 | Ha et al. | |
| 2012/0142817 A1* | 6/2012 | Swarup ............. | C08G 59/4021 523/400 |
| 2012/0181080 A1 | 7/2012 | Lionetta | |
| 2014/0047710 A1 | 2/2014 | Simmons et al. | |
| 2014/0150970 A1 | 6/2014 | Desai et al. | |
| 2017/0028600 A1 | 2/2017 | McIntyre et al. | |
| 2017/0050887 A1 | 2/2017 | Alessi et al. | |
| 2017/0121840 A1 | 5/2017 | Evans et al. | |
| 2017/0137563 A1 | 5/2017 | Tanaka et al. | |
| 2017/0210951 A1 | 7/2017 | Abe et al. | |
| 2017/0226387 A1 | 8/2017 | Shinohara | |
| 2018/0026003 A1 | 1/2018 | Mihara et al. | |
| 2018/0061196 A1 | 2/2018 | Thiele et al. | |
| 2018/0079710 A1 | 3/2018 | Kasemi et al. | |
| 2018/0156202 A1 | 6/2018 | Lipka et al. | |
| 2018/0245566 A1 | 8/2018 | Sawada | |

FOREIGN PATENT DOCUMENTS

| | | | |
|---|---|---|---|
| CN | 105567144 A | 5/2016 | |
| CN | 104854176 | 6/2017 | |
| EP | 2264310 A2 | 12/2010 | |
| JP | 63172722 A | 7/1986 | |
| JP | 03124407 A | 5/1991 | |
| JP | 073229 A | 1/1995 | |
| JP | 2008186590 A | 8/2008 | |
| JP | 2011231297 A | 11/2011 | |
| JP | 2012524851 A | 10/2012 | |
| JP | 2013022757 A | 2/2013 | |
| JP | 2013084587 A | 5/2013 | |
| JP | 6149683 B2 | 6/2017 | |
| SG | 11201704918 | 7/2017 | |
| TW | 201714187 | 4/2017 | |
| WO | 2004059663 A1 | 7/2004 | |
| WO | 2009079216 A1 | 6/2009 | |
| WO | 2009147415 A1 | 12/2009 | |
| WO | 2016048885 A1 | 3/2016 | |
| WO | 2017007750 A1 | 1/2017 | |
| WO | 2017033249 A1 | 3/2017 | |
| WO | 2017035709 A1 | 3/2017 | |
| WO | 2017036710 A1 | 3/2017 | |
| WO | 2017066563 A1 | 4/2017 | |

OTHER PUBLICATIONS

Mantena "Electrical and mechanical properties of mwcnt filled conductive adhesives on lead free surface finished pcb's", 2009, University of Kentucky Master's Thesis (44 pages).*
Radzuan et al "The effect of milled carbon fibre filler on electrical conductivity in highly conductive polymer composites", Composites Part B 110 (2017) 153-160.*
"Carbon recycling: a soluble problem", REINFORCEDplastics May 2009 pp. 22-27.*
Argentinian Office Action for Argentinian Application No. 20190100802, dated Jun. 30, 2022, 8 pages, (No English language translation provided).
Chinese Office Action for Chinese Application No. 201980033619.3, dated Oct. 11, 2021 with translation, 10 pages.
Chinese Office Action for Chinese Application No. 201980033619.3, dated Mar. 22, 2022 with translation, 4 pages.
European Communication for European Application No. 19 719 999.5, dated Dec. 17, 2021, 7 pages.
International Preliminary Report on Patentability for International Application No. PCT/US2019/024563, dated Sep. 29, 2020, 10 pages.
International Search Report and Written Opinion for International Application No. PCT/US2019/024563, dated Jul. 23, 2019, 12 pages.
XP-002792788, Database WPI, Week 201211, Thomas Scientific, London, GB, AN2012-A38824, dated Jul. 19, 2011, 2 pages.
Entire patent prosecution history of U.S. Appl. No. 17/041,735, filed Sep. 25, 2020, entitled, "Electrically Conductive Adhesive."
Japanese Office Action for Japanese Application No. 2020-552255, dated Feb. 14, 2023 with translation, 13 pages.

* cited by examiner

Using the conductive adhesive to cover the exposed chamfer regions and nearby surface of adjoining plate resists electrical arcing at ply drop-off

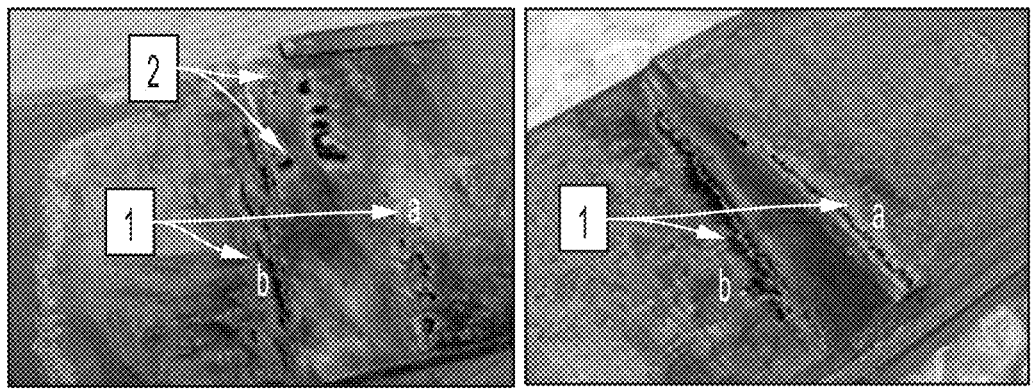

Non-conductive Adhesive Joint

Electrical energy arcs from plate 1 to plate 2 using two paths:
1. From the nearby surface of one plate (a) to the nearby surface of the second plate (b)
2. Through the non-conductive adhesive layer itself

Conductive Adhesive Joint

Electrical energy arcs from plate 1 to plate 2 using only one path:
1. From the nearby surface of one plate (a) to the nearby surface of the second plate (b)

FIG. 13

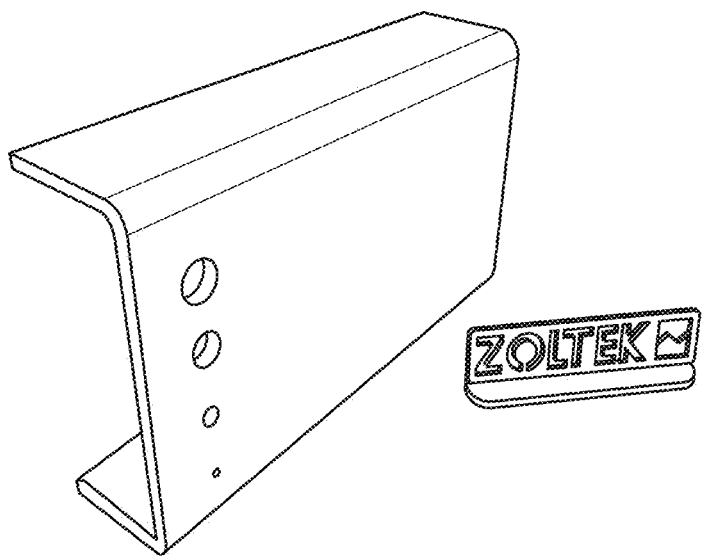

FIG. 14

ELECTRICALLY CONDUCTIVE ADHESIVE

CROSS-REFERENCE TO RELATED APPLICATIONS

This application is a divisional of U.S. patent application Ser. No. 17/041,735, filed Sep. 25, 2020, which is a national stage application under 35 U.S.C. § 371 of International Application No. PCT/US2019/024563, filed Mar. 28, 2019, which is, related to, and claims the benefit of priority of U.S. Provisional Application No. 62/649,054, entitled ELECTRICALLY CONDUCTIVE ADHESIVE, filed on Mar. 28, 2018, the contents of each of these applications are incorporated herein by reference in their entireties for all purposes.

FIELD OF THE INVENTION

The present disclosure relates generally to electrically conductive adhesive composition including milled carbon fibers dispersed in a thermosetting resin and a curative agent. The present disclosure also relates generally to articles comprising at least two components adhesively bonded by the electrically conductive adhesive composition and methods of making such adhesives and articles.

BACKGROUND OF THE INVENTION

Many electrically conductive surfaces when bonded using an adhesive display good longitudinal or surface electrical conductivity, but poor through-thickness transverse electrical conductivity. Hence, there is a need for an improved electrically conductive adhesive for bonding electrically conductive surfaces and for improving the through-thickness transverse electrical conductivity of bonded surfaces.

SUMMARY OF THE INVENTION

In an aspect, there is an electrically conductive adhesive composition comprising milled carbon fibers dispersed in a thermosetting resin and a curative agent.

In another aspect, there is an article comprising at least two components, where a portion of a first component is adhesively bonded to a portion of a second component using the electrically conductive adhesive composition of the present invention.

In yet another aspect, there is a spar cap comprising a plurality of fiber-reinforced resin composite sheets adhesively bonded to each other using the electrically conductive adhesive composition of the present invention, wherein each fiber-reinforced resin composite sheet comprises 50 to 80% by volume of carbon fibers fused with a binder resin, wherein the amount in % by volume is based on the total volume of the fiber-reinforced resin composite sheet.

In yet another aspect, there is a method comprising the steps of dispersing milled carbon fibers in a thermosetting resin to form a mixture and adding a curative agent to the mixture and optionally curing to form an electrically conductive adhesive.

BRIEF DESCRIPTION OF THE DRAWINGS

The accompanying drawings, which are incorporated in and constitute a part of this specification, illustrate one (several) embodiment(s) of the invention, and together with the written description, serve to explain certain principles of the invention.

FIG. 13 shows the results of an electrical strike in a non-conductive adhesive joint and a conductive adhesive joint.

FIG. 14 shows a picture of an exemplary C-section, in accordance with various embodiments of the present invention.

DETAILED DESCRIPTION OF THE INVENTION

Figure 1:
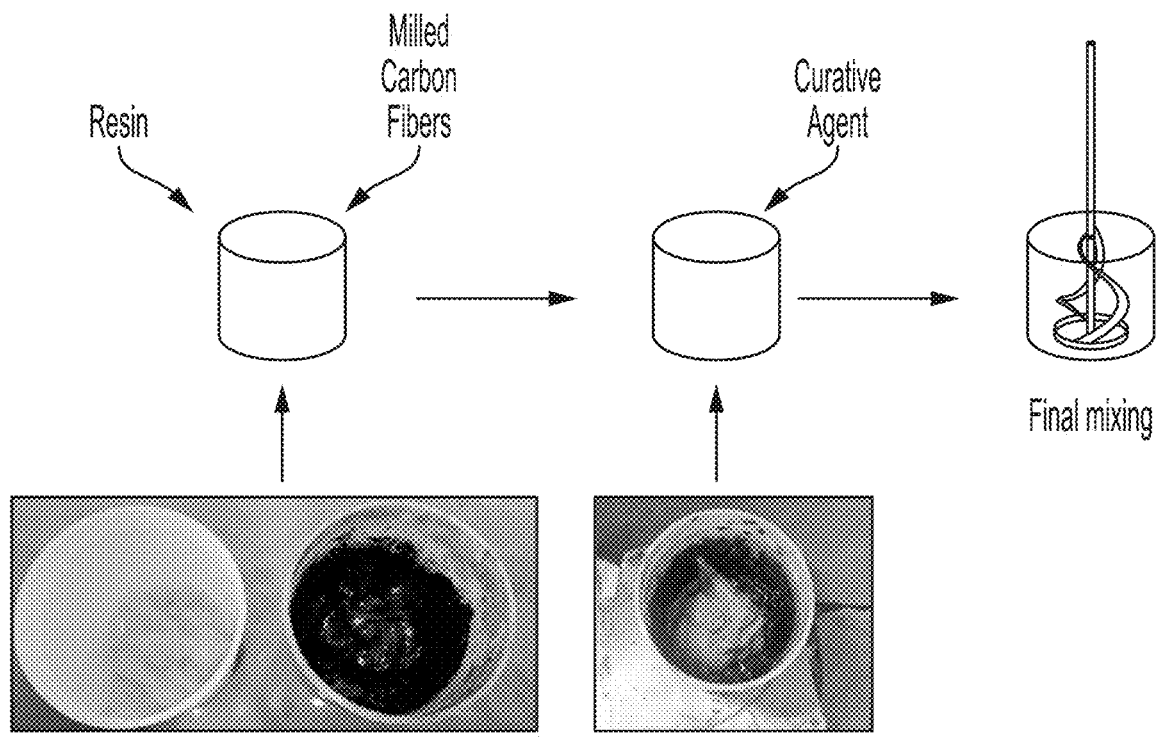
FIG. 1 shows a method of making an electrically conductive adhesive, in accordance with various embodiments of the present invention.

Although the invention is illustrated and described herein with reference to specific embodiments, the invention is not intended to be limited to the details shown. Rather, various modifications may be made in the details within the scope and range of equivalents of the claims and without departing from the invention.

The wind energy industry requires lightning protection for the blades in which carbon fiber-reinforced resin composites have been commonly used for the spar caps Procured carbon fiber-reinforced resin composites are typically bonded together in a stack using a binder resin which is not electrically conductive. Due to the strong anisotropy of the electrical conductivity of the carbon fibers and uni-directional planar tow form of these carbon fiber-reinforced resin composites, the lengthwise conductivity of these carbon fiber-reinforced resin composites can be four orders of magnitude higher than transverse conductivity. Hence, as a result of this anisotropy, during a lightning strike, the high energy electricity would flow lengthwise, but would arc transversely, which could result in elevation in temperature, and thereby can cause delamination or incineration of the spar cap. Therefore, it has been discovered that there is a need to effectively enhance the through-thickness transverse electrical conductivity of the carbon fiber-reinforced resin composites forming the spar cap. It has been contemplated to increase the electrical conductivity of materials by various techniques, such as:

Incorporating nanomaterials in adhesives. However, nanomaterials are expensive and may require special precautions in handling further increasing COM, as powdered nanomaterials can be considered a hazardous material in some environments.

Incorporating metal particles and/or metal coated particles in adhesives.

Improving conductivities of prepreg materials rather than adhesives

Some targeted film making

Some targeted surface films and treatments

To the extent that these approaches have various issues, alternative approaches may be more efficient and cost effective for enhancing the electrical conductivity of adhesives. Further, enhancing the electrical conductivity of adhesives provides a way to assure electrical continuity through the entire thickness of a bonded stack of plates in a spar cap. It is the objective of the present invention to effectively enhance the electrical conductivity of adhesives.

Disclosed herein is an electrically conductive adhesive composition, articles comprising at least two components adhesively bonded by the electrically conductive adhesive composition and methods of making thereof.

In an aspect, there is an electrically conductive adhesive composition comprising milled carbon fibers dispersed in a thermosetting resin and a curative agent. The milled carbon fibers can be present in an amount in the range of 2 to 40 weight %, or 1 to 50 weight %, based on the total weight of the electrically conductive adhesive composition.

In an embodiment, the adhesive composition has a linear conductivity in the range of $10^{-12}$ to $10^{-8}$ Siemens/m (S/m).

Any suitable milled carbon fibers can be used, whether they are milled from pristine carbon fibers or recycled carbon fibers. In an embodiment, the milled carbon fibers are recycled milled carbon fibers, free of sizing. As used herein, the phrase "recycled milled carbon fibers, free of sizing" refers to carbon fibers that end up as waste at some point in their lifecycle. The fiber source of the recycled milled carbon fibers could be fiber that was deemed unsuitable for continuous or chopped fiber product, fiber that was cut off during normal production of the fiber, or left over from the manufacturing process of carbon fiber intermediate products. Additionally, there is a little bit of fiber left over at the end of each fiber production run—that can be used as fiber source for making recycled milled carbon fiber. These wasted carbon fibers are stripped of any sizing that they might have had before being milled and converted into milled carbon fibers.

In an embodiment, the milled carbon fibers have an electrical resistivity of about 0.00155 Ohm-cm. The milled carbon fibers can have an average diameter in the range of 5 to 10 microns, and an average length in the range of 5 to 300 microns. In an embodiment, milled carbon fibers can have an average diameter of 7.2 microns and an average length of 100 microns. Suitable examples of commercially available milled carbon fibers include, but are not limited to: PX35MF0150, PX35MF0200, all available from Zoltek Corporation.

Any suitable thermosetting resin can be used, including, but not limited to at least one of epoxy resin, vinyl ester resins, phenolic resins (such as, phenolic formaldehyde (PF) resins, phenolic neoprene, resorcinol formaldehydes (RF)), unsaturated polyesters, thermoset polyurethanes, polyimides, bismaleimide resins, benzoxazine resins, silicone resins, and any combination, copolymer, and/or derivative thereof.

In an embodiment, the thermosetting resin is an epoxy resin. Some examples of commercially available thermosetting resin include, but are not limited to: Sikadur WTG-1280 Part A, available from Sika Corporation; Körapur 4 W-Komp A, available from Kömmerling Corporation.

In another embodiment, the curative agent comprises an amine functional group. Some examples of commercially available curative agent include, but are not limited to: Sikadur WTG-1050 Part B, available from Sika Corporation; and Köracur 4 W-Komp B available from Kömmerling Corporation.

In yet another embodiment, the thermosetting resin and the curative agent are available as a two component adhesive kit. Some examples of commercially available two component adhesive kit include, but are not limited to: Sikadur WTG-1280, available from Sika Corporation; and Körapur 4 W available from Kömmerling Corporation.

In an embodiment, the electrically conductive adhesive composition of the present invention is suitable for use in the wind blade bonding applications.

The electrically conductive adhesive of the present disclosure could be used for various conductive bonding applications besides spar caps, such as the connection of the cables connecting the spar cap to the main down conductor cable that is part of the lightning protection system for the blade.

Method of Making an Adhesive Composition

In an aspect, there is a method comprising the steps of dispersing milled carbon fibers in a thermosetting resin to form a mixture, adding a curative agent to the mixture, followed by mixing thoroughly and optionally curing to form an electrically conductive adhesive. Any suitable mechanical means can be used for the step of dispersing milled carbon fibers in a thermosetting resin to form a mixture. In an embodiment, the step of adding curative agent to the mixture and mixing is done in air, or under inert environment. In another embodiment, the step of adding curative agent to the mixture and mixing is done under vacuum. The amount of time required for each mixing step will depend upon the composition and the mechanical means and can be in the range 30 seconds to 60 minutes.

Article

In another aspect, there is an article comprising at least two components, where a portion of a first component is adhesively bonded to a portion of a second component using the electrically conductive adhesive composition, as disclosed hereinabove.

Any suitable material can be used for the components. In one embodiment, at least one of the at least two components comprises a fiber-reinforced resin composite. The fiber-reinforced resin composite may include a fiber and a binder resin.

In an embodiment of the fiber-reinforced resin composite, the fiber is a carbon fiber. In another embodiment, the fiber is an electrically conductive sized fiber.

In yet another embodiment, the fiber-reinforced resin composite comprises carbon fibers fused with a binder resin.

The fiber-reinforced resin composites according to the present invention may be formed from and based on any binder resin known in the art.

Non-limiting examples of a binder resin that is a thermoset (co)polymer includes unsaturated polyesters, epoxy resins, vinyl ester resins, phenolic resins, thermoset polyurethanes, polyimides, bismaleimide resins, benzoxazine resins, and silicone resins.

Non limiting examples of a binder resin that is a thermoplastic (co)polymer includes, polyolefins, cyclic polyolefins, acrylonitrile butadiene styrene, polyvinyl chloride, polystyrene, thermoplastic polyesters, polyvinyl alcohols, polymethyl methacrylates, styrene maleic anhydrides, polyoxymethylene (acetals), thermoplastic polyurethanes, polyethylene terephthalates, polytrimethylene terephthalates, polybutylene terephthalates, polyamides, polycarbonates, polyvinylpyrrolidone, polytetrafluoroethylene, polysulfones, polyethersulfones, polyphenylene sulfides, polyetherimides, polyamide-imides, polyetheretherketones, and polyaryletherketones, including alloys and blends.

In an embodiment, the fiber-reinforced resin composite is in the form of a pultruded sheet, a fabric, or a prepreg. In another embodiment, the fiber-reinforced resin composite in the form of a pultruded sheet incudes carbon fibers in a planar tow form fused with the binder resin. In yet another embodiment, the fiber-reinforced resin composite in the form of a fabric, with the fiber being a multidirectional fabric, a unidirectional fabric or a woven fabric.

In an embodiment, the fiber-reinforced resin composite includes at least one of 20-80% by volume of fiber reinforcement and a vinyl ester resin, 20-80% by volume of fiber reinforcement and a polyester resin or 20-80% by volume of fiber reinforcement and an epoxy resin, where the amount in % by volume is based on the total volume of the fiber-reinforced resin composite.

In an embodiment, the fiber-reinforced resin composite is in the form of a pultruded sheet, a resin-infused fabric, a pre-impregnated tape, or a sheet molding compound. In the pultruded form, the fiber may be present in an amount in the range of 40-80%, or preferably 60-72%, by volume, based on the total volume of the fiber-reinforced resin composite. In the pultruded form, the fiber may be present in an amount in the range of 40-80%, or preferably 60-72%, by volume, based on the total volume of the fiber-reinforced resin composite. In the prepreg form, the fiber may be present in an amount in the range of 40-80%, or preferably 54-61%, by volume, based on the total volume of the fiber-reinforced resin composite. In the resin-infused fabric form, the fiber may be present in an amount in the range of 40-80%, or preferably 48-59%, by volume, based on the total volume of the fiber-reinforced resin composite.

The fiber-reinforced resin composite may also include any filler and/or particle, known in the art for reinforcing composites, such as polymer composites. Examples of such particles include, but are not limited to, talc, calcium carbonate, aluminum hydroxide, titanium oxides, and silica.

Article

In an aspect, there is an article comprising at least two components adhesively bonded to each other using the electrically conductive adhesive composition, where at least one of the at least two components includes the fiber-reinforced resin composite, as disclosed hereinabove.

Figure 5:
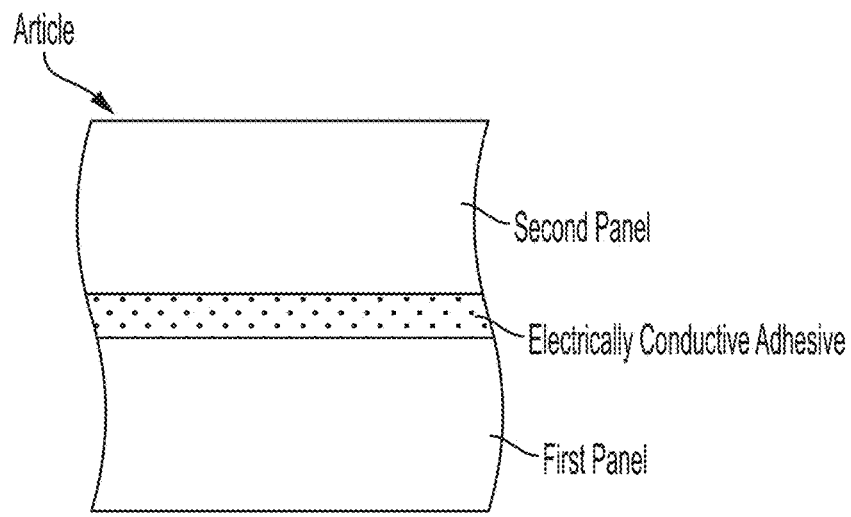
FIG. 5 shows a sectional view of a portion of an exemplary article comprising a composite panel, in accordance with various embodiments of the present invention.

FIG. 5 shows a sectional view of a portion of an exemplary article comprising a composite panel, in accordance with various embodiments of the present invention. The exemplary composite panel includes two components, a first component adhesively bonded to a second component using the electrically conductive adhesive composition disposed between and in contact with the first component and the second component. In an embodiment, at least one of the two components comprises a fiber-reinforced resin composite.

Figure 6:
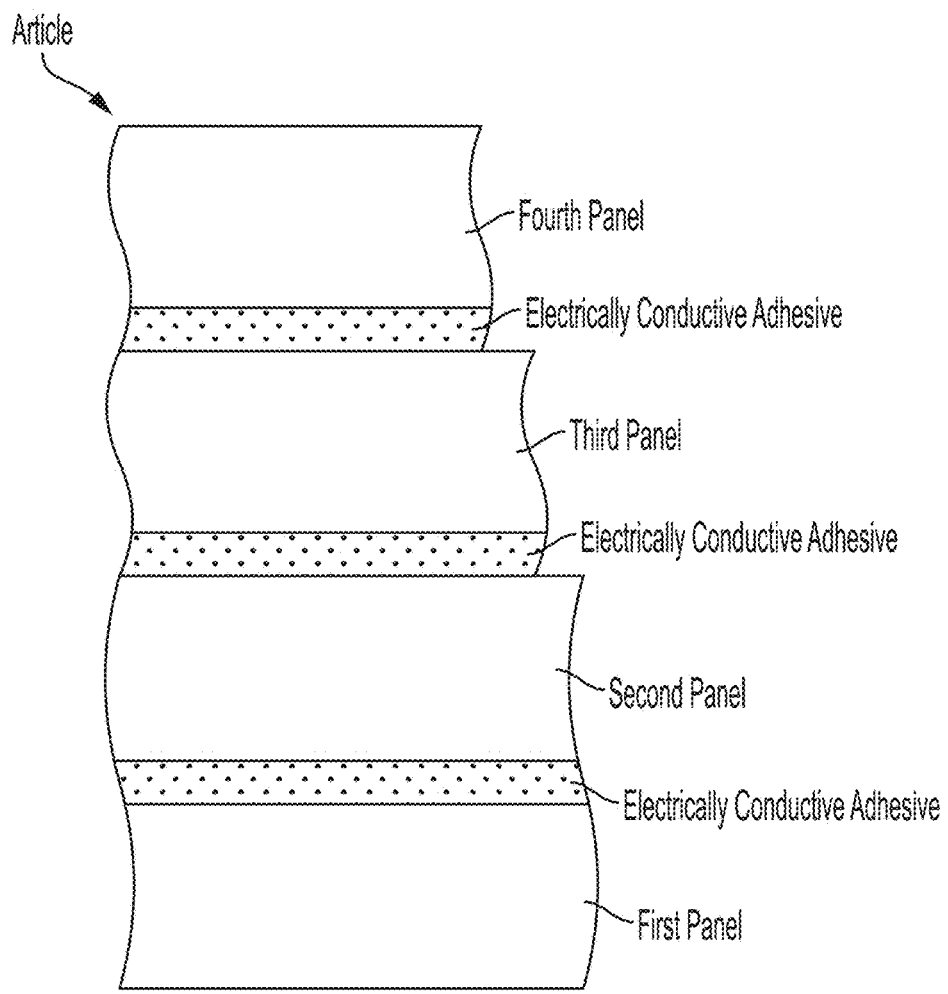
FIG. 6 shows a sectional view of a portion of another exemplary article comprising a composite panel, in accordance with various embodiments of the present invention.

FIG. 6 shows a sectional view of a portion of another exemplary article comprising a composite panel comprising a plurality of panels adhesively bonded to each other using the electrically conductive adhesive composition of the present disclosure. As shown in FIG. 6, the exemplary composite panel comprises at least four panels, a first panel is adhesively bonded to a second panel, the second panel adhesively bonded to a third panel and the third panel adhesively bonded to a fourth panel using the electrically conductive adhesive composition disposed between and in contact with the each panel. In an embodiment, the panels are stacked on top of each other such that at least one edge is slanted and has a slope. In an embodiment, at least one of the plurality of panels comprises a fiber-reinforced resin composite.

The composite panels of the present invention can have any suitable thickness, such as in the range of 0.5-30 mm.

Figure 10:
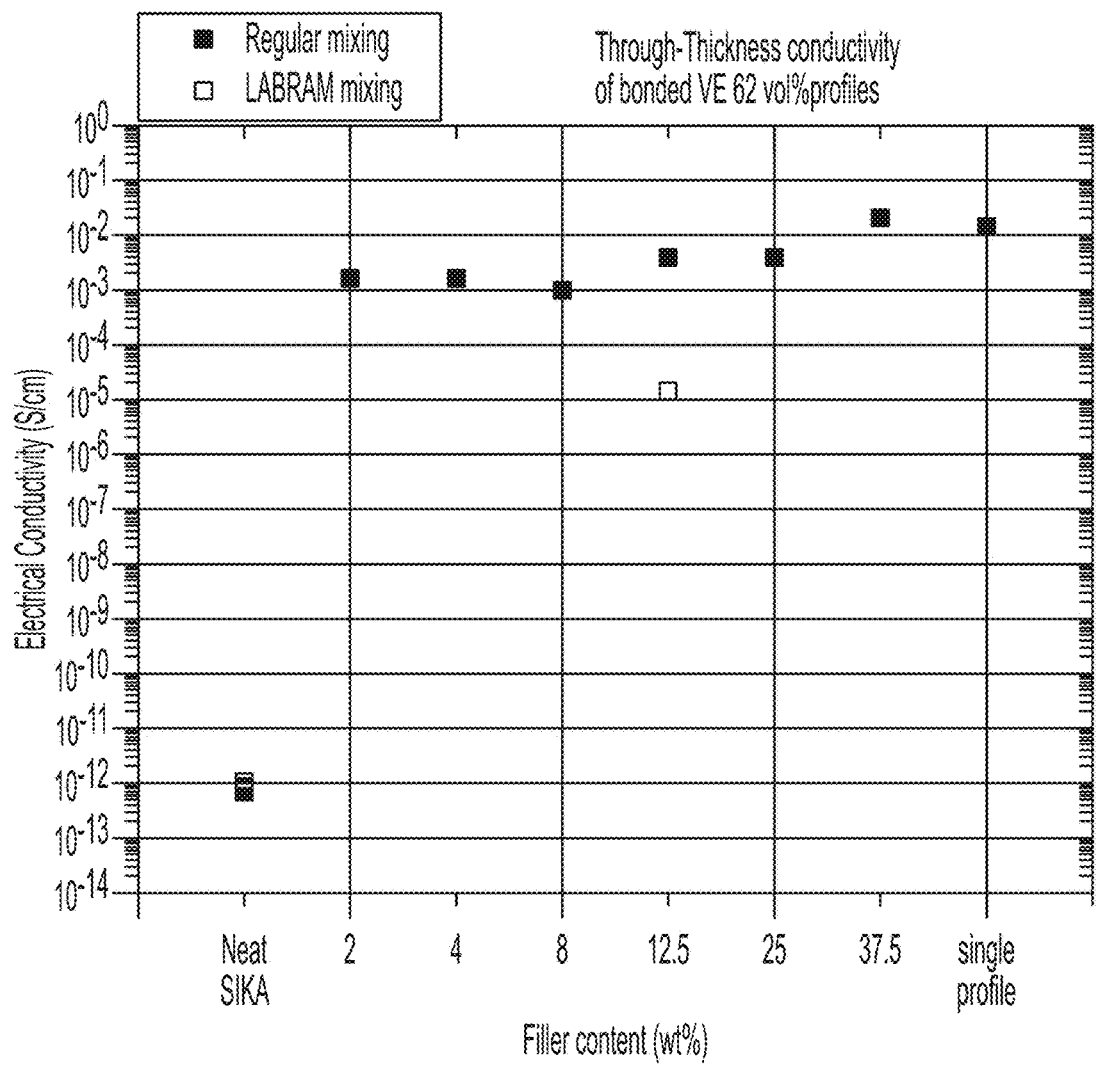
FIG. 10 shows a graph showing through-thickness electrical conductivity of a composite panel comprising two pultruded sheets adhesively bonded by the electrically conductive adhesive of the present invention made by two different mixing methods, as a function of filler content, wherein each pultruded sheet comprises 20-80% by volume of carbon fiber fused with a vinyl ester resin.

In an embodiment, the article is a spar cap including a plurality of fiber-reinforced resin composite sheets adhesively bonded to each other using the electrically conductive adhesive composition of the present invention. FIG. 10 shows a schematic sectional diagram of a portion of a spar cap.

Figure 7:
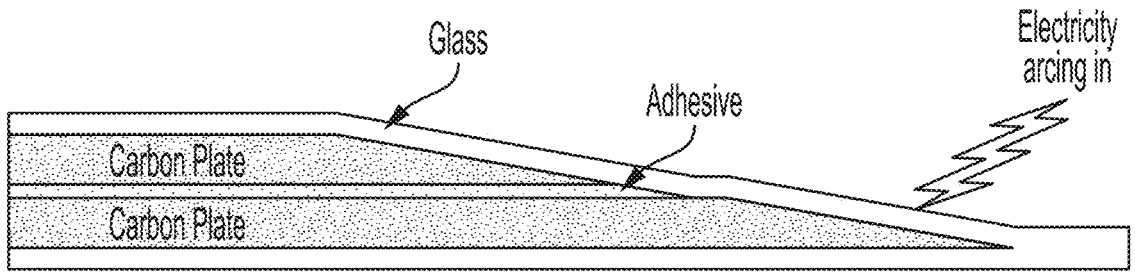
FIG. 7 shows an exemplary schematic sectional diagram of a portion of a spar cap, in accordance with various embodiments of the present invention.

FIG. 7 shows an exemplary schematic sectional diagram of a portion of a spar cap, in accordance with various embodiments of the present invention. In particular, FIG. 7 shows a configuration of bonded plates in a spar cap.

Figure 8:
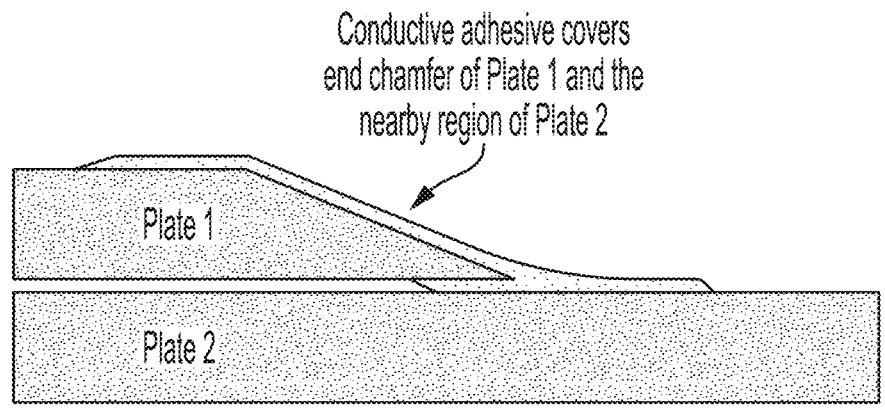
FIG. 8 shows another exemplary schematic sectional diagram of a portion of a spar cap, in accordance with various embodiments of the present invention.

FIG. 8 shows another exemplary schematic sectional diagram of a portion of a spar cap, in accordance with various embodiments of the present invention. In particular, FIG. 8 shows the use of the conductive adhesive to cover the end of the chamfer region of one plate and the surrounding surface area of the chamfered plate and the adjoining plate.

In an embodiment of the spar cap, the fiber-reinforced resin composite sheet comprises 20-80% by volume of carbon fibers fused with a vinyl ester resin. In another embodiment of the spar cap, the fiber-reinforced resin composite sheet comprises 20-80% by volume of fused with an epoxy resin. In another embodiment of the spar cap, the fiber-reinforced resin composite sheet comprises 20-80% by volume of fused with a polyester resin. In yet another embodiment of the spar cap, at least one of the plurality of fiber-reinforced resin composite sheets is a pultruded sheet comprising 40-80%, or preferably 60-72%, by volume of fiber, based on the total volume of the fiber-reinforced resin composite.

In an embodiment, there is an article comprising at least two components, where a portion of a first component is adhesively bonded to a portion of a second component by an electrically conductive adhesive of the present disclosure. In an embodiment, the article is a spar cap and the two components form a chamfer region. In another embodiment, the article further comprises the electrically conductive adhesive disposed over at least one of the at least two components. In yet another embodiment, the electrically conductive adhesive extends beyond the chamfer region onto both surfaces of the adjoining components.

It is believed that the electrical conductivity would be maintained between the adhesively bonded fiber-reinforced resin composite sheets using the conductive adhesive composition of the present application, thereby minimizing the arcing phenomenon. The resulting spar cap of the present invention will be far more lightning resistant that one without a conductive interlayer between the fiber-reinforced resin composite sheets.

Method of Making a Composite Panel

In an aspect, there is a method comprising applying the electrically conductive adhesive on a portion of a surface of a first panel; and adhesively bonding a second panel to the first panel, such that the electrically conductive adhesive is disposed between the first and the panel to form a composite panel. Any suitable method can be used for the application of adhesive, including but not limited to spray, web coating, wheel or brush coating. The method of application is based on specific composition of the electrically conductive adhesive, the nature of the panels and production requirements. The method can further include curing the composite panel. The curing can be done thermally or photochemically, depending upon the nature of the curative agent present in the adhesive composition. The curing can be done in air, under inert environment or under vacuum.

In an embodiment, at least one of the first or the second panel comprises a fiber-reinforced resin composite, as disclosed hereinabove.

In an aspect, the method may further include forming a fiber-reinforced resin composite in the form of a pultruded sheet or a resin-infused fabric, or a pre-impregnated tape (prepreg, impregnated with a thermoplastic resin or a thermosetting resin), or a sheet molding compound (SMC). In an embodiment, the step of forming a fiber-reinforced resin composite can include arranging a fiber into a fabric and infusing the fabric with a binder resin to form a resin infused fabric or a prepreg. In another embodiment, the step of forming a fiber-reinforced resin composite can include arranging a fiber into a planar tow form, infusing the planar tow form with a binder resin and pultruding the resin infused planar tow form to form a pultruded sheet.

In another embodiment, the step of forming a fiber-reinforced resin composite can include arranging a combination of a fiber and a fabric into a structural cross section form, infusing the structural cross section form with a binder resin and pultruding the resin infused section form to result in a pultruded structural section (for example a C-section, J-section, or Pi-section). FIG. 14 shows a picture of an exemplary C-section, in accordance with various embodiments of the present invention.

In another embodiment, the step of forming a fiber-reinforced resin composite can include compounding at least one of a plurality of chopped or a plurality of continuous fibers with a binder resin and compression molding or injection molding the resulting composition into an article.

In another embodiment, the method may include a step of making a composite panel in the form of a spar cap.

In an embodiment, the electrically conductive adhesive composition of the present invention is suitable for use in the wind blade applications.

The use of the electrically conductive adhesive composition of the present invention in adhesively bonding at least two components, provides several advantages over conventional adhesives, including, but not limited to:

Low cost, as the milled fiber is much less expensive than the nanomaterials, as disclosed in the prior art. The characteristic dimension of nanoparticles is not needed for this application and hence would be an unnecessary cost burden. Furthermore, no special precautions must be taken with the powdered form of milled carbon fiber. In contrast, powdered nanomaterials can be considered a hazardous material in some environments.

Due to their aspect ratio, the milled fibers impart some structural/mechanical benefit to the adhesive.

Milled carbon fiber assures perfect compatibility with the carbon plates being bonded.

Figure 9:
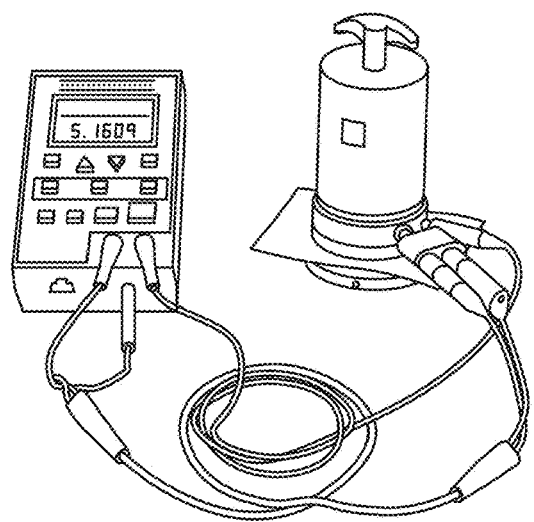
FIG. 9 shows an exemplary experimental set-up for measuring through thickness electrical conductivity in accordance to ANSI ANSI/ESD STM11.12.

Relatively low levels of milled carbon fiber are needed to assure electrical continuity through the thickness of a stack of carbon plates, as shown in FIGS. 7-9.

For the 2-part adhesive, the milled fiber can be premixed into the Part A (resin component), thereby providing to the user a 2 part electrically conductive adhesive. Hence, the user will maintain a common process when mixing and using the 2 part electrically conductive adhesive. Additionally, this enables point-of-use mixing with automatic mixing tube applicators.

For the wind blade manufacturing application, using the two-part adhesives already used provides maintenance of the process familiarity, mechanical bonding properties, and handling characteristics.

In contrast to all other known approaches, the present invention discloses the use of milled carbon fiber as the conductive filler. By using the resulting conductive adhesive in the lamination of procured carbon composites, the electrical conductivity reduces the flash over of electricity between layers during a lightning strike event in wind turbine blades.

More specifically, the following represents particular embodiments of the invention:

1. An electrically conductive adhesive composition comprising:
   a) milled carbon fibers dispersed in a thermosetting resin; and
   b) a curative agent.
2. The electrically conductive adhesive composition according to embodiment 1, wherein the thermosetting resin is an epoxide resin.
3. The electrically conductive adhesive composition according to embodiments 1 or 2, wherein the curative agent comprises an amine functional group.
4. The electrically conductive adhesive composition according to any one of the preceding embodiments, wherein the thermosetting resin comprises at least one of epoxy resin, vinyl ester resins, phenolic resins, unsaturated polyesters, thermoset polyurethanes, polyimides, bismaleimide resins, benzoxazine resins, silicone resins, and any combination, copolymer, and/or derivative thereof.
5. The electrically conductive adhesive composition according to any one of the preceding embodiments, wherein the milled carbon fibers are present in an amount in the range of 1 to 20 weight %, based on the total weight of the electrically conductive adhesive composition 6. The electrically conductive adhesive composition according to any one of the preceding embodiments, wherein the milled carbon fibers have an average diameter in the range of 5 to 10 microns and an average length in the range of 1 to 300 microns.
7. The electrically conductive adhesive composition according to any one of the preceding embodiments, wherein the adhesive composition has a linear conductivity in the range of $10^{-12}$-$10^{-8}$ Siemens/m (S/m).
8. The electrically conductive adhesive composition of according to any one of the preceding embodiments, wherein the milled carbon fibers are free of sizing.
9. The electrically conductive adhesive composition of according to any one of the preceding embodiments, wherein the milled carbon fibers are pristine or recycled milled carbon fibers, free of sizing.
10. An article comprising at least two components, where a portion of a first component is adhesively bonded to a portion of a second component using the electrically conductive adhesive composition according to any one of the embodiments 1-9.
11. The article according to embodiment 10, wherein at least one of the at least two components comprises a fiber-reinforced resin composite.
12. The article according to embodiment 11, wherein the fiber-reinforced resin composite comprises carbon fibers fused with a binder resin.
13. The article according to embodiment 10, wherein at least one of the at least two components is in the form of a pultruded sheet, a resin-infused fabric, a pre-impregnated tape, or a sheet molding compound.
14. The article according to embodiment 12, wherein the pultruded sheet comprises carbon fibers in a planar tow form fused with a binder resin.
15. The article according to embodiment 12, wherein the binder resin comprises a thermosetting binder resin chosen from among unsaturated polyesters, epoxy resins, vinyl ester resins, phenolic resins, thermoset polyurethanes, polyimides, bismaleimide resins, benzoxazine resins, and silicone resins.
16. The article according to embodiment 12, wherein the binder resin comprises a thermoplastic binder resin chosen from among polyolefins, cyclic polyolefins, acrylonitrile butadiene styrene, polyvinyl chloride, polystyrene, thermoplastic polyesters, polyvinyl alcohols, polymethyl methacrylates, styrene maleic anhydrides, polyoxymethylene (acetals), thermoplastic polyurethanes, polyethylene terephthalates, polytrimethylene terephthalates, polybutylene terephthalates, polyamides, polycarbonates, polyvinylpyrrolidone, polytetrafluoroethylene, polysulfones, polyethersulfones, polyphenylene sulfides, polyetherimides, polyamide-imides, polyetheretherketones, and polyaryletherketones, including alloys and blends.
17. The article according to any one of embodiments 13, wherein the fabric comprises a multidirectional fabric, a unidirectional fabric or a woven fabric.
18. The article according to embodiment 13, wherein the pultruded sheet comprises at least one of:
    a) 20-80% by volume of carbon fibers fused with a vinyl ester resin, or
    b) 20-80% by volume of carbon fibers fused with an epoxy resin,
    wherein the amount in % by volume is based on the total volume of the fiber-reinforced resin composite.
19. A spar cap comprising a plurality of fiber-reinforced resin composite sheets adhesively bonded to each other using the adhesive composition according to any one of the embodiments 1-9,
    wherein each fiber-reinforced resin composite sheet comprises 50 to 80% by volume of carbon fibers fused with a binder resin, wherein the amount in % by volume is based on the total volume of the fiber-reinforced resin composite sheet.
20. The spar cap according to embodiment 19, wherein the fiber-reinforced resin composite sheet comprises 20-80% by volume of carbon fibers fused with a vinyl ester resin.
21. The spar cap according to embodiment 19, wherein the fiber-reinforced resin composite sheet comprises 20-80% by volume of carbon fibers fused with an epoxy resin.
22. A method comprising:
    a) dispersing milled carbon fibers in a thermosetting resin to form a mixture; and
    b) adding a curative agent to the mixture and optionally curing to form an electrically conductive adhesive.
23. The method according to embodiment 22 wherein the step of dispersing milled carbon fibers in a thermosetting resin to form a mixture is done mechanically.
24. The method according to embodiment 23, wherein the step of adding a curative agent to the mixture further comprises mixing under vacuum.
25. The method according to according to any one of the embodiments 22-24, further comprising:
    a) applying the electrically conductive adhesive on a portion of a surface of a first component; and
    b) adhesively bonding a second component to the first component, such that the electrically conductive adhesive is disposed between the first and the components to form a composite panel.
26. The method according to embodiment 25, wherein at least one of the first or the second components comprises a fiber-reinforced resin composite.
27. The method according to embodiment 26, wherein the fiber-reinforced resin composite comprises carbon fibers fused with a binder resin.
28. The method according to embodiment 26, wherein the fiber-reinforced resin composite is in the form of a pultruded sheet, a resin-infused fabric, a pre-impregnated tape, or a sheet molding compound.
29. The method according to embodiment 28, wherein the pultruded sheet comprises carbon fibers in a planar tow form fused with a binder resin.
30. The method according to embodiment 27, wherein the binder resin comprises a thermosetting binder resin chosen from among unsaturated polyesters, epoxy resins, vinyl ester resins, phenolic resins, thermoset polyurethanes, polyimides, bismaleimide resins, benzoxazine resins, and silicone resins.
31. The method according to embodiment 27, wherein the binder resin comprises a thermoplastic binder resin chosen from among polyolefins, cyclic polyolefins, acrylonitrile butadiene styrene, polyvinyl chloride, polystyrene, thermoplastic polyesters, polyvinyl alcohols, polymethyl methacrylates, styrene maleic anhydrides, polyoxymethylene (acetals), thermoplastic polyurethanes, polyethylene terephthalates, polytrimethylene terephthalates, polybutylene terephthalates, polyamides, polycarbonates, polyvinylpyrrolidone, polytetrafluoroethylene, polysulfones, polyethersulfones, polyphenylene sulfides, polyetherimides, polyamide-imides, polyetheretherketones, and polyaryletherketones, including alloys and blends.

32. The method according to embodiment 28, wherein the fabric comprises a multidirectional fabric, a unidirectional fabric or a woven fabric.

33. The method according to embodiment 28, wherein the pultruded sheet comprises 20-80% by volume carbon fibers, based on the total volume of the fiber-reinforced resin composite.

34. The method according to embodiment 28, wherein the fiber-reinforced resin composite is in a form of a pultruded sheet comprising 20-80% by volume of carbon fibers fused with a vinyl ester resin.

35. The method according to embodiment 28, wherein the fiber-reinforced resin composite is in a form of a pultruded sheet comprising 20-80% by volume of carbon fibers fused with an epoxy resin.

36. The method according to any one of the embodiments 25-35, wherein the composite panel is in the form of a spar cap.

37. An article comprising at least two components, where a portion of a first component is adhesively bonded to a portion of a second component by an electrically conductive adhesive according to any one of the embodiments 1-9.

38. The article of claim 37 wherein the article is a spar cap and wherein the two components forms a chamfer region.

39. The article according to embodiment 37, further comprising the electrically conductive adhesive disposed over at least one of the at least two components.

40. The article according to embodiment 38, and wherein the electrically conductive adhesive extends beyond the chamfer region onto both surfaces of the adjoining components.

The invention will be further explained by the following Examples, which are intended to be purely exemplary of the invention, and should not be considered as limiting the invention in any way.

EXAMPLES

Materials Used:
Thermosetting epoxy resin available as Sikadur WTG-1280 (Part A) and curative agent available as Sikadur WTG-1050 (Part B), were obtained from Sika Corporation. ZOLTEK PX35 MF200 milled fibers (~5 µm to 150 µm in length by ~7 µm in diameter) were obtained from Zoltek Corporation. All materials were used as is.
Pultruded Profiles Used:
Profiles of pultruded sheet used in the examples below:
62% Fiber Volume Fraction (FVF) carbon fiber with 38% Vinyl ester
72% FVF carbon fiber with 28% Epoxy resin
Testing Methods:
Volume (through-thickness) electrical conductivity can be determined from electrical resistance per ANSI ANSI/ESD STM11.12, using a PROSTAT® PRS-801 Resistance System or similar instrument and PROSTAT PRF-911 Concentric Ring or similar apparatus, as shown in FIG. 9.

Basic Process

Figure 2:
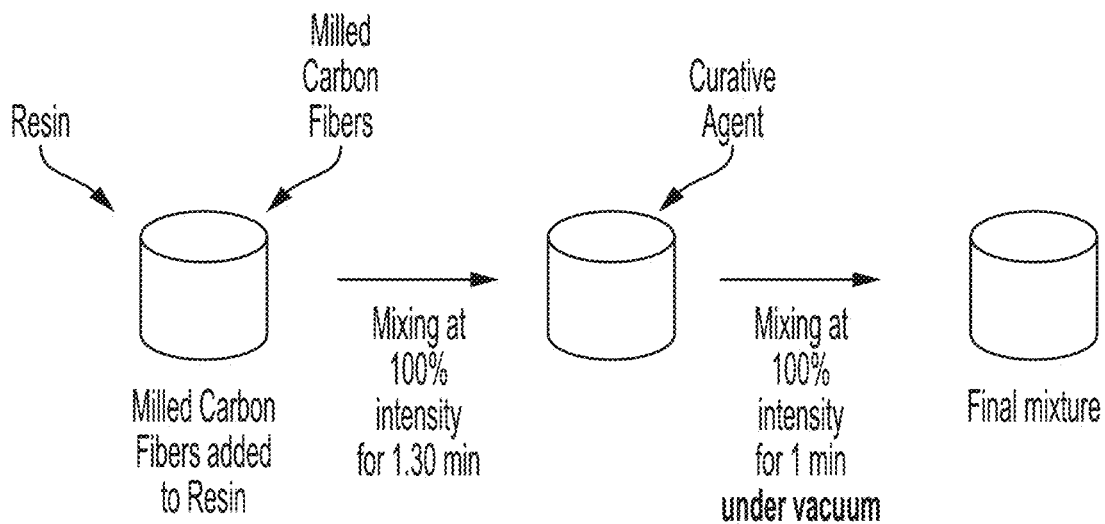
FIG. 2 shows another method of making an electrically conductive adhesive, in accordance with various embodiments of the present invention.

Step 1 Method of Making an Electrically Conductive Adhesive as Shown in FIGS. 1 and 2
Milled carbon fibers (PX35 MF200) were mixed into a thermosetting epoxy resin (Part A, Sikadur WTG-1280) of the two part adhesive. The milled carbon fibers were added in various amounts in the range of 2-37.5 weight %, based on the total weight of the adhesive composition. The mixing was done until the two components were thoroughly combined to form a uniform mixture. Then, the curative agent/hardener portion (Part B, Sikadur WTG-1050) was added to the Part A/milled fiber mixture in a 50:50 ratio, according to the manufacturer's instructions, and mixed until thoroughly combined to form an electrically conductive adhesive.

Figure 3:
FIG. 3 shows results of difference in the mixing methods: without and with vacuum.

As shown in FIGS. 1 and 2, the step of mixing of the Part A/milled fiber mixture with Part B can be done in air or partially under vacuum. FIG. 3 shows the difference between when the mixing is done in air versus when the step of mixing of the Part A/milled fiber mixture with Part B was done under vacuum. As is clear from FIG. 3, the mixing under vacuum provides certain advantages over when carried out in air, such as uniform mixing and no air bubbles. Air bubbles can be detrimental to attaining a thin uniform layer of adhesive over a panel.

Figure 4:
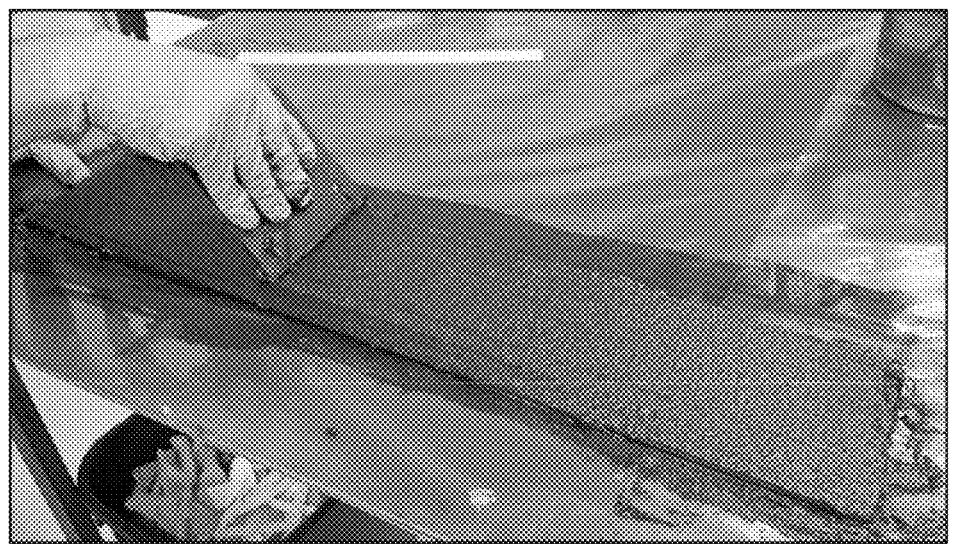
FIG. 4 shows a method of application of electrically conductive adhesive of the present invention on to a surface of a panel.

Step 2: Method of Making a Composite Panel as Shown in FIGS. 4-6
A pultruded composite panel was formed by first applying the fully mixed electrically conductive adhesive as a thin even layer on one side of one of a first pultruded plates (62% Vf Vinyl ester or 72% Vf Epoxy resin), as shown in FIG. 4. Then, the second pultruded plate is placed on top of the adhesive layer of the first pultruded plate to form a bonded stack of pultrude composite panel, as shown in FIG. 5.

This process of applying a thin layer of electrically conductive adhesive and adding subsequent plates to form a bonded stack of pultruded composite panel can be continued for as many panels as desired, as shown in FIG. 6.

The bonded stack of pultruded composite panels was cured under vacuum at the adhesive supplier's recommended cure cycle of curing under vacuum at 70° C. for 5 hours.

Figure 11:
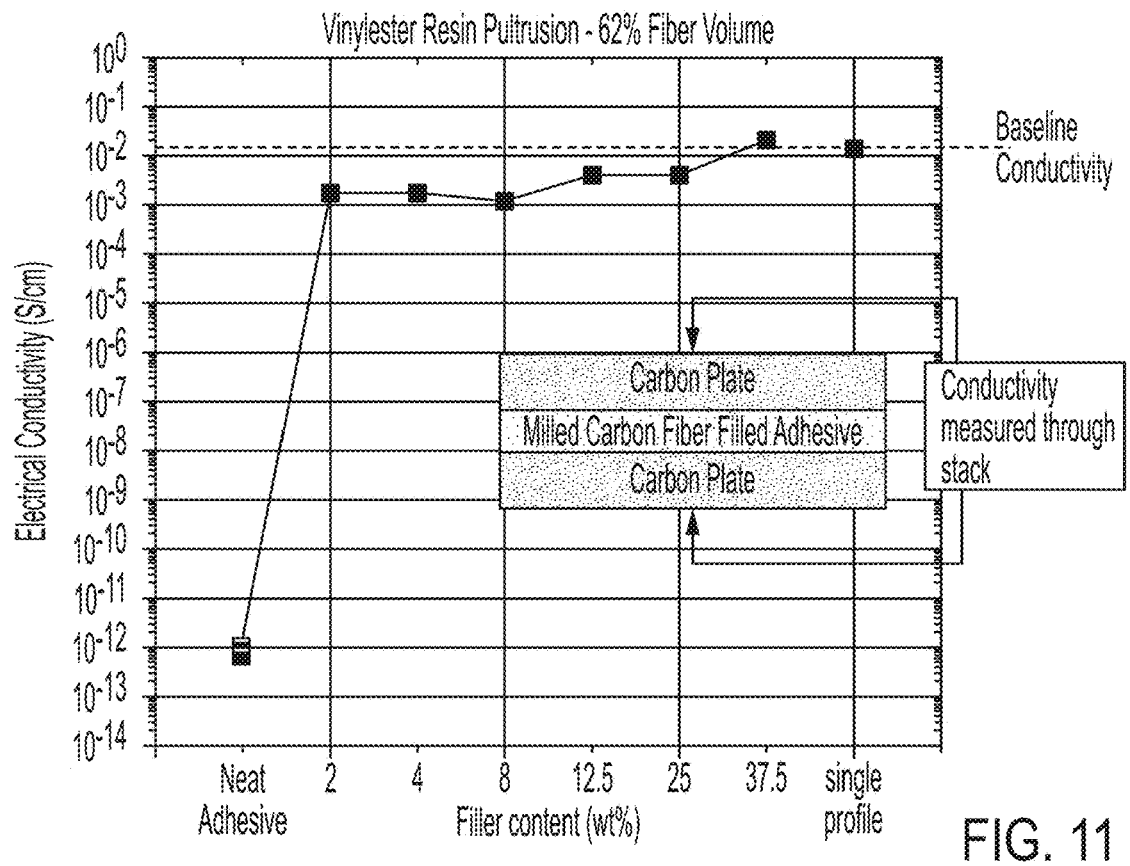
FIG. 11 shows a graph showing through-thickness electrical conductivity of a composite panel comprising two pultruded sheets adhesively bonded by the electrically conductive adhesive of the present invention, as a function of filler content, wherein each pultruded sheet comprises 20-80% by volume of carbon fiber.
Figure 12:
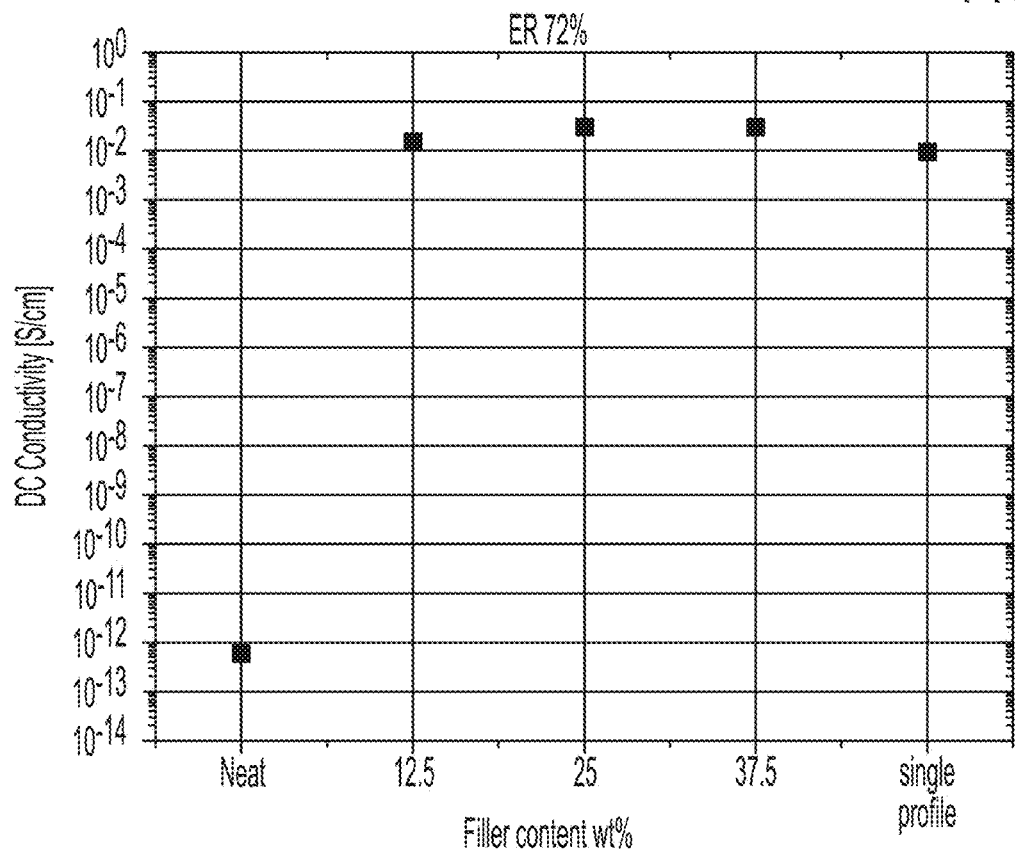
FIG. 12 shows a graph showing through-thickness electrical conductivity of a composite panel comprising two pultruded sheets adhesively bonded by the electrically conductive adhesive of the present invention made by two different mixing methods, as a function of filler content, wherein each pultruded sheet comprises 20-80% by volume of carbon fiber fused with an epoxy resin.

Electrical conductivity testing was performed on composite panels to confirm dramatic improvement in conductivity through the thickness of the stack, as shown in FIGS. 10-12.

FIG. 10 shows a graph showing through-thickness electrical conductivity of a composite panel comprising two pultruded sheets adhesively bonded by the electrically conductive adhesive of the present invention made by two different mixing methods (regular mixing versus mixing done using a Resodyn LabRam model ResonantAcoustic® Mixer (RAM)), as a function of filler content, wherein each pultruded sheet comprises 62% by volume of carbon fiber fused with a vinyl ester resin. As can be seen in FIG. 10, the electrical conductivity of composite panel formed using ResonantAcoustic® mixer had lower conductivity as compared to one done in air, even though the mixing under vacuum resulted in uniform mixture with no air bubbles. This discrepancy was due to a portion of part B being stuck on the walls of the LabRam mixer resulting in an amount ratio of curative agent/hardener portion (Part B, Sikadur WTG-1050) to the Part A/milled fiber mixture different from supplier suggested 50:50 ratio.

FIG. 11 shows a graph showing through-thickness electrical conductivity of a composite panel comprising two pultruded sheets adhesively bonded by the electrically conductive adhesive of the present disclosure, as a function of filler content, where each pultruded sheet comprises 62% by volume of carbon fiber.

FIG. 12 shows a graph showing through-thickness electrical conductivity of a composite panel comprising two pultruded sheets adhesively bonded by the electrically conductive adhesive or the various embodiments of the present disclosure, made by two different mixing methods, as a function of filler content, wherein each pultruded sheet comprises 72% by volume of carbon fiber fused with an epoxy resin.

FIGS. 11 and 12 shows that irrespective of the composition of fiber-reinforced composite, the adhesive composition provided a surprising and dramatic increase in the electrical conductivity measured through stack, as compared to neat adhesive and reaches close to that of single panel (single profile).

FIG. 13 compares the effect of using the conductive adhesive to chamfer region of two plates. The first panel in the FIG. 13 shows the results of a non-conductive joint when struck by electrical energy. The energy arcs from both the nearby surface of one plate (a) to the nearby surface of the second plate (b) and through the non-conductive adhesive layer itself.

The second panel in the FIG. 13 shows the results of the same electrical strike in a conductively bonded joint. In this panel, the electricity arcs using only one path only from nearby surface to nearby surface of the two plates. As shown in FIG. 13, the conductive joint shows no damage from the strike. A method of applying the conductive adhesive to the surface area of each plate adjacent to the joint and the chamfer will reduce the potential for arcing near the joint.

It will be apparent to those skilled in the art that various modifications and variations can be made in the practice of the present invention without departing from the scope or spirit of the invention. Other embodiments of the invention will be apparent to those skilled in the art from consideration of the specification and practice of the invention. It is intended that the specification and examples be considered as exemplary only, with a true scope and spirit of the invention being indicated by the following claims.

What is claimed is:

1. An electrically conductive adhesive composition consisting of:
   milled carbon fibers dispersed in a thermosetting resin; and
   a curative agent, wherein the curative agent comprises an amine functional group; and
   one or more particles including talc, calcium carbonate, aluminum hydroxide, titanium oxides, and silica,
   wherein the milled carbon fibers have an average diameter in the range of 5 to 10 microns and an average length in the range of 100 to 300 microns.

2. The electrically conductive adhesive composition according to claim 1, wherein the thermosetting resin is an epoxide resin.

3. The electrically conductive adhesive composition according to claim 1, wherein the thermosetting resin comprises at least one of epoxy resin, vinyl ester resins, phenolic resins, unsaturated polyesters, thermoset polyurethanes, polyimides, bismaleimide resins, benzoxazine resins, silicone resins, and any combination, copolymer, and/or derivative thereof.

4. The electrically conductive adhesive composition according to claim 1, wherein the milled carbon fibers are present in an amount in the range of 1 to 20 weight %, based on the total weight of the electrically conductive adhesive composition.

5. The electrically conductive adhesive composition according to claim 1, wherein the adhesive composition has a linear conductivity in the range of $10^{-12}$ to $10^{-8}$ Siemens/m (S/m).

6. The electrically conductive adhesive composition according to claim 1, wherein the milled carbon fibers are free of sizing.

7. The electrically conductive adhesive composition according to claim 1, wherein the milled carbon fibers are pristine or recycled milled carbon fibers.

8. The electrically conductive adhesive composition according to claim 1, wherein the milled carbon fibers are present in an amount in the range of 1 to 50 weight %, based on the total weight of the electrically conductive adhesive composition.

9. The electrically conductive adhesive composition according to claim 1, wherein the milled carbon fibers are present in an amount in the range of 21 to 50 weight %, based on the total weight of the electrically conductive adhesive composition.

* * * * *